(12) United States Patent
Keane et al.

(10) Patent No.: US 8,191,668 B2
(45) Date of Patent: Jun. 5, 2012

(54) MOUNTING ASSEMBLY FOR EMISSIONS CONTROL SYSTEM

(75) Inventors: Martin Joseph Keane, Oak Lawn, IL (US); Scott Ira Archey, Joliet, IL (US); Jeffery David Lind, Naperville, IL (US); Jerry Edward Berkeland, Waterman, IL (US); Paul Frederick Olsen, Chillicothe, IL (US); Tazio Stephan Grivetti, Chillicothe, IL (US); Jack Albert Merchant, Peoria, IL (US); Christopher Martin Pogioli, Mackinaw, IL (US)

(73) Assignee: Caterpillar Inc., Peoria, IL (US)

( * ) Notice: Subject to any disclaimer, the term of this patent is extended or adjusted under 35 U.S.C. 154(b) by 682 days.

(21) Appl. No.: 12/320,421

(22) Filed: Jan. 26, 2009

(65) Prior Publication Data

US 2010/0031644 A1    Feb. 11, 2010

Related U.S. Application Data

(60) Provisional application No. 61/086,848, filed on Aug. 7, 2008.

(51) Int. Cl.
*B60K 13/04* (2006.01)
(52) U.S. Cl. ........................... 180/296; 180/309
(58) Field of Classification Search .................. 180/296, 180/309
See application file for complete search history.

(56) References Cited

U.S. PATENT DOCUMENTS

| | | | |
|---|---|---|---|
| 2,250,795 A | 7/1941 | Fitz Gerald et al. | |
| 2,925,874 A * | 2/1960 | Norrie | 180/296 |
| 3,394,772 A * | 7/1968 | Abold | 180/69.2 |
| 3,801,151 A * | 4/1974 | Reynolds et al. | 296/190.05 |
| 3,834,478 A | 9/1974 | Alexander et al. | |
| 3,882,951 A | 5/1975 | Conley | |
| 4,060,143 A | 11/1977 | Matsumoto et al. | |
| 4,133,547 A * | 1/1979 | Fox | 180/68.3 |
| 4,378,945 A * | 4/1983 | Trautman | 277/608 |
| 5,785,139 A | 7/1998 | Freedy et al. | |
| 5,832,726 A * | 11/1998 | Rees et al. | 60/322 |
| 6,024,164 A | 2/2000 | Sorbel | |
| 6,092,616 A | 7/2000 | Burris et al. | |
| 6,591,935 B1 * | 7/2003 | Petley | 180/309 |
| 6,648,088 B2 | 11/2003 | Gabioli | |
| 6,880,656 B2 | 4/2005 | Pfusterschmid et al. | |
| 6,966,355 B2 | 11/2005 | Branham et al. | |
| 7,213,847 B2 * | 5/2007 | Umiastowski | 285/235 |
| 2007/0057564 A1 * | 3/2007 | Colling | 298/1 H |
| 2008/0093151 A1 * | 4/2008 | Ogawa et al. | 180/296 |

* cited by examiner

*Primary Examiner* — John R Olszewski
(74) *Attorney, Agent, or Firm* — Finnegan, Henderson, Farabow, Garrett & Dunner LLP

(57) ABSTRACT

An exhaust system is disclosed. The exhaust system may have an emissions control system including a mount and at least one exhaust treatment device secured to the mount. The exhaust system may also have a mounting assembly including a platform and a base frame. The emissions control system may be secured to the platform. The mounting assembly may be configured to position the emissions control system substantially adjacent to a power source. The platform may be movable relative to the base frame between a first position and a second position.

22 Claims, 10 Drawing Sheets

MOUNTING ASSEMBLY FOR EMISSIONS CONTROL SYSTEM

RELATED APPLICATION

This application is based upon and claims the benefit of priority from U.S. Provisional Application No. 61/086,848 filed on Aug. 7, 2008, the entire contents of which are incorporated herein by reference.

TECHNICAL FIELD

This patent disclosure relates generally to a mounting assembly and, more particularly, to a mounting assembly for an emissions control system.

BACKGROUND

Conventional diesel powered systems for engines, factories, and power plants produce emissions that contain a variety of pollutants. These pollutants may include, for example, particulate matter (e.g., soot), nitrogen oxides (NOx), and sulfur compounds. Due to heightened environmental concerns, engine exhaust emission standards have become increasingly stringent. In order to comply with emission standards, machine manufactures have developed and implemented a variety of exhaust treatment components to reduce pollutants in exhaust gas prior to the exhaust gas being released into the atmosphere. The exhaust treatment components may include, for example, a diesel particulate filter, a selective catalytic reduction device, a diesel oxidation catalyst, a fuel-fired burner for regeneration of the diesel particulate filter, a muffler, and other similar components.

Frequently these exhaust treatment components, including their associated sensors and electronics, are mounted individually in an exhaust system within the available space using individual brackets. However, due to the increasing complexity and number of exhaust treatment components and the small amount of available space, mounting and interconnecting exhaust treatment components has proven difficult. Furthermore, mounting the aftertreatment equipment in the vicinity of the engine can result in difficulty in accessing the engine.

One example of aftertreatment equipment coupled to an engine is disclosed in U.S. Pat. No. 4,060,143 to Matsumoto et al (the '143 patent). The '143 patent discloses an engine mounted on the vehicle body and a muffler connected to an exhaust port of the engine to reduce the noise level of exhaust gas. The '143 patent also discloses a pair of supporting levers to support the muffler, where one end of the supporting levers is pivotally connected to the vehicle body. The '143 patent further discloses a pair of linkages pivotally connected between the engine and the muffler supporting levers, whereby a vibration caused by the engine can be absorbed by combined operation of the supporting levers and the linkages.

Although the device of the '143 patent may include pivotally connected supporting levers to help prevent damage to the muffler due to vibrations, it may still obstruct or inhibit access to engine components, making servicing and maintenance of the engine difficult, particularly in the field.

The disclosed device is directed to overcoming one or more of the problems set forth above.

SUMMARY

In one aspect, the disclosure is directed to an exhaust system. The exhaust system may include an emissions control system including a mount and at least one exhaust treatment device secured to the mount. The exhaust system may also include a mounting assembly including a platform and a base frame. The emissions control system may be secured to the platform. The mounting assembly may be configured to position the emissions control system substantially adjacent to a power source. The platform may be movable relative to the base frame between a first position and a second position.

In another aspect, the disclosure is directed to another exhaust system. The exhaust system may include a mount configured to support at least one exhaust treatment device. The exhaust system may also include a mounting assembly including a platform and a base frame. The mount may be secured to the platform. The mounting assembly may be positioned adjacent to a power source. The platform may be movable relative to the base frame between a first position and a second position. The at least one exhaust treatment device may be fluidly coupled to the power source when the platform is in the first position. The exhaust treatment device may decouple from the power source when the platform moves to the second position.

In another aspect, the disclosure is directed to a further exhaust system. The exhaust system may include an emissions control system. The emissions control system may include a mount and at least one exhaust treatment device secured to the mount. The exhaust system may also include a mounting assembly including a base. The mount may be pivotably secured to the base. The mounting assembly may be configured to position the emissions control system substantially adjacent to a power source. The mount may be movable relative to the base between a first position and a second position. The at least one exhaust treatment device may be fluidly coupled to the power source when the mount is in the first position. The exhaust treatment device may decouple from the power source when the mount moves to the second position

DETAILED DESCRIPTION

Figure 1:
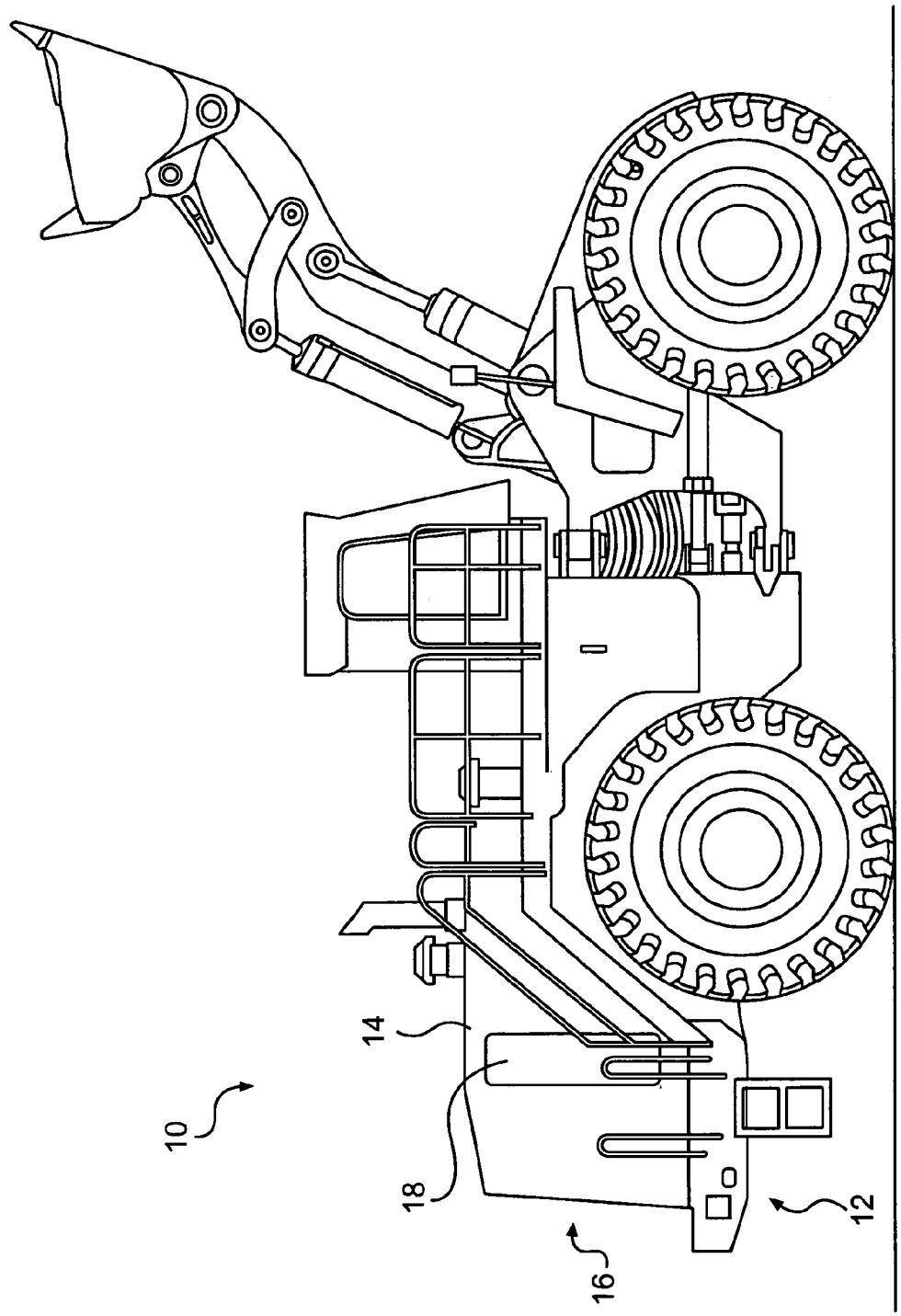
FIG. 1 is a side view of an exemplary disclosed machine.

FIG. 1 illustrates an exemplary machine 10. Machine 10 may be a mobile machine that performs some type of operation associated with an industry such as mining, construction, farming, transportation, or any other industry known in the art. For example, machine 10 may be an earth moving machine, such as an excavator, a wheel loader, a dump truck, a backhoe, or any other suitable earth moving machine known in the art. Machine 10 may include a frame 12 and a body 14. Body 14 may define an power source compartment 16. Body 14 may include one or more removable access doors 18, which are pivotably coupled to body 14 and permit access to an interior of power source compartment 16.

Figure 2:
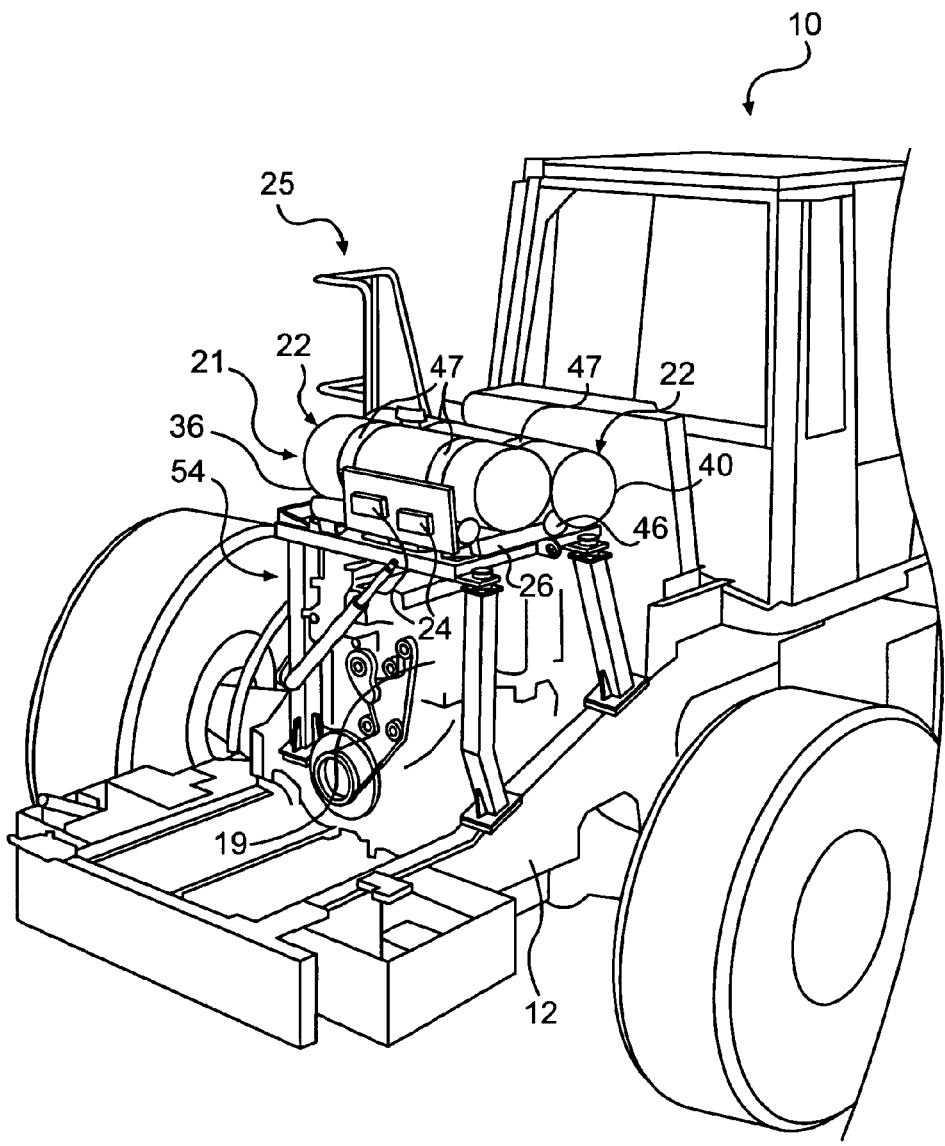
FIG. 2 is an isometric view of the machine of FIG. 1 with an engine compartment cover removed and illustrating an embodiment of the disclosed mounting assembly and emissions control system.

As shown in FIG. 2, machine 10 may include a power source 19 located within power source compartment 16 and coupled to frame 12. Power source 19 may embody a combustion engine, such as, for example, a diesel engine, a gasoline engine, a gaseous fuel-powered engine (e.g., a natural gas engine), or any other type of combustion engine known to one skilled in the art. Power source 19 may have a plurality of combustion chambers (not shown) that convert potential chemical energy (usually in the form of a combustible gas) into useful mechanical work. Power source 19 may receive air from an intake (not shown). Power source 19 may output exhaust via exhaust system 25. Exhaust system 25 may include an emissions control system 21 and a mounting assembly 54. Exhaust system 25 may direct exhaust from power source 19 via emissions control system 21 and to the atmosphere.

Emissions control system 21 may be configured to monitor, control, and/or modify exhaust emissions. Emissions control system 21 may include one or more exhaust treatment devices 22, electronics 24, and a mount 26.

Exhaust treatment devices 22 may be devices configured to reduce emissions of harmful gasses, particulate matter, and/or noise emitted from power source 19. Each exhaust treatment device 22 may embody, for example, a diesel oxidation catalyst (DOC), a particulate filter (PF or DPF), a selective catalytic reduction (SCR) device, a lean NOx trap (LNT), a muffler, a regeneration device, a reductant mixing device, or any other exhaust treatment device known in the art. It is contemplated that each exhaust treatment device 22 may also comprise a combination of exhaust treatment devices, such as, for example, a combination of a DOC and a DPF; a combination of a catalyst and a DPF (i.e., a CDPF); a combination of a DOC, a DPF, and an SCR; or other combinations known in the art.

Electronics 24 may be configured to monitor and/or control operation of exhaust treatment devices 22. Electronics 24 may include one or more electronic devices, such as, for example, sensors, microprocessors, power supply circuitry, signal conditioning circuitry, actuator driving circuitry, solenoids, relays, electronic valves, coils, and/or other types of electronics and circuitry known in the art. For example, electronics 24 may include a microprocessor and other electronic hardware configured to control injection of a reductant into one of exhaust treatment devices 22 (e.g., reductant for SCR or LNT). Electronics 24 may also include a microprocessor and other electronic hardware configured to control a regeneration process for one of exhaust treatment devices 22 (e.g., regeneration of DPF).

Figure 3:
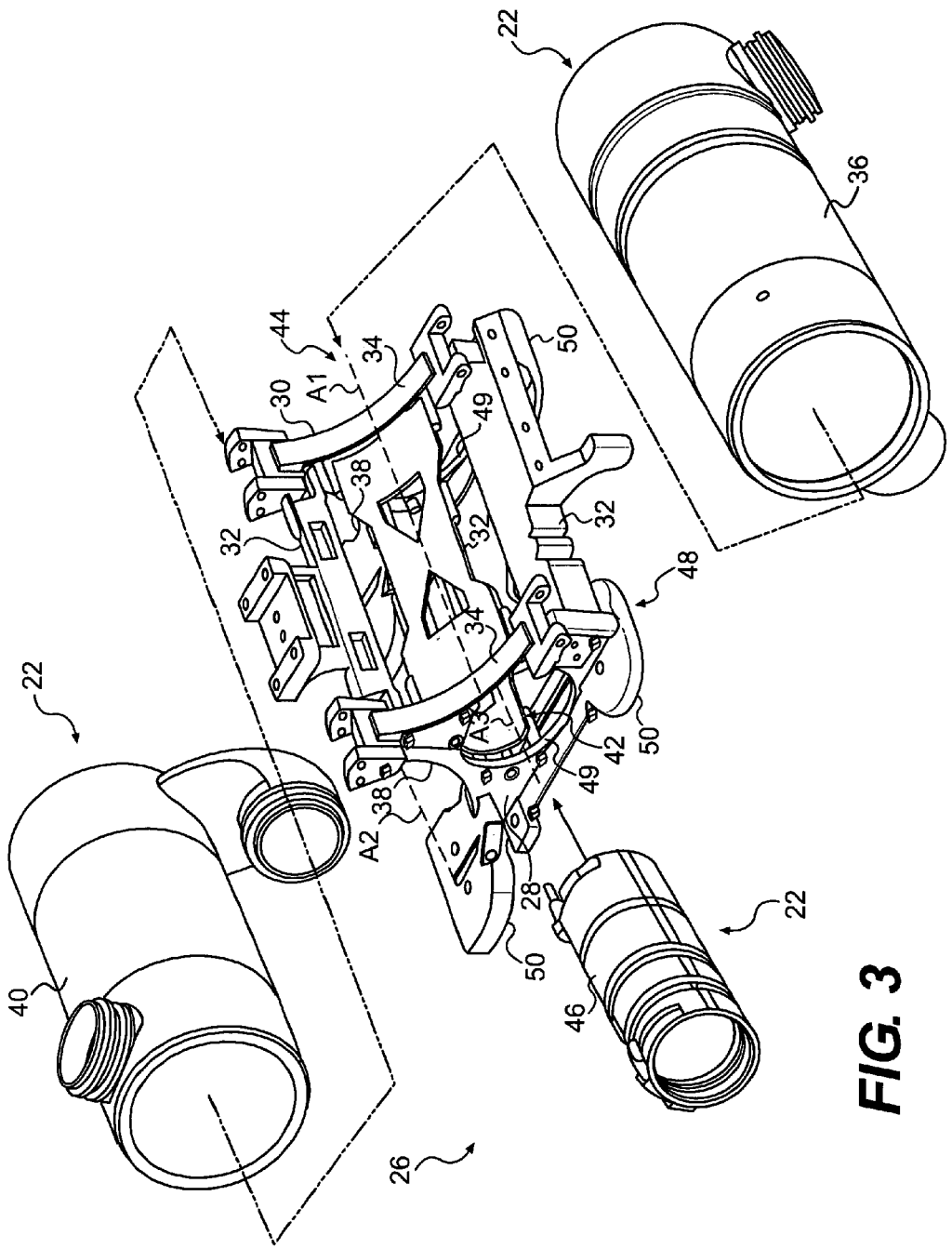
FIG. 3. is a diagrammatic illustration of an exemplary mount that may be used with the emissions control system FIG. 2.

As shown in FIG. 3, mount 26 may be a device configured to support multiple exhaust treatment devices 22 using a single structure. Specifically, mount 26 may be configured to secure exhaust treatment devices 22 in a compact configuration. Mount 26 may include a first bracket 28 and a second bracket 30. First bracket 28 and second bracket 30 may be oriented parallel but spaced apart from each other. First bracket 28 may be coupled to second bracket 30 using one or more rigid cross members 32. Cross members 32 may attach to first and second brackets 28 and 30 via mechanical fasteners (e.g., bolts, screws, rivets, etc.), welding, brazing, or any other joining process known in the art. Alternatively, first bracket 28, second bracket 30, and cross members 32 may be formed using a single casting.

Each of first and second brackets 28 and 30 may include a first support surface 34. First support surface 34 of first bracket 28 and first support surface 34 of second bracket 30 may be configured to support each end of a first exhaust treatment device 36. Each of first and second brackets 28 and 30 may also include a second support surface 38. Second support surface 38 of first bracket 28 and second support surface 38 of second bracket 30 may be configured to support each end of a second exhaust treatment device 40. In addition to connecting first and second brackets 28 and 30, one or more of cross members 32 may be configured to support a middle portion of first exhaust treatment device 36 and/or second exhaust treatment device 40.

It is contemplated that a geometry of first support surface 34 may be shaped to match an outer geometry of first exhaust treatment device 36 and a geometry of second support surface 38 may be shaped to match an outer geometry of second exhaust treatment device 40. For example, when first and second exhaust treatment devices 36 and 40 are shaped as canisters, first and second support surfaces 34 and 38 may have generally arcuate surfaces with substantially the same radii of curvature as first and second exhaust treatment devices 36 and 40, respectively. One or more bands 47 (see FIG. 4) may pass over exhaust treatment devices 22 and secure exhaust treatment devices 22 to mount 26.

Mount 26 may also include a first aperture 42 in first bracket 28 and a second aperture 44 in second bracket 30. Each of first and second apertures 42 and 44 may include a third support surface 49. Third support surface 49 of first aperture 42 and third support surface 49 of second aperture 44 may be configured to support, for example, each end of a third exhaust treatment device 46. In an exemplary embodiment of emissions control system 16, first exhaust treatment device 36 may embody a diesel particulate filter, second exhaust treatment device 40 may embody a muffler, and third exhaust treatment device 46 may embody a tube for injection and mixing of reductant.

It should be noted that first support surfaces 34, second support surfaces 38, and third support surfaces 49 may be located to allow for first, second, and third exhaust treatment devices, 36, 40, and 46, respectively, to be positioned in a compact parallel orientation. For example, an axis A1 of first support surfaces 34, an axis A2 of second support surfaces 38, and an axis A3 of third support surfaces 49 may all be parallel. It is contemplated that mount 26 may be configured to allow for easy access and removal of each exhaust treatment device 22.

Mount 26 may include a base portion 48 with one or more footings 50. Specifically, each of first and second brackets 28 and 30 may include, for example, at least two footings 50. Each footing 50 may be configured to mount to mounting assembly 54.

Figure 4:
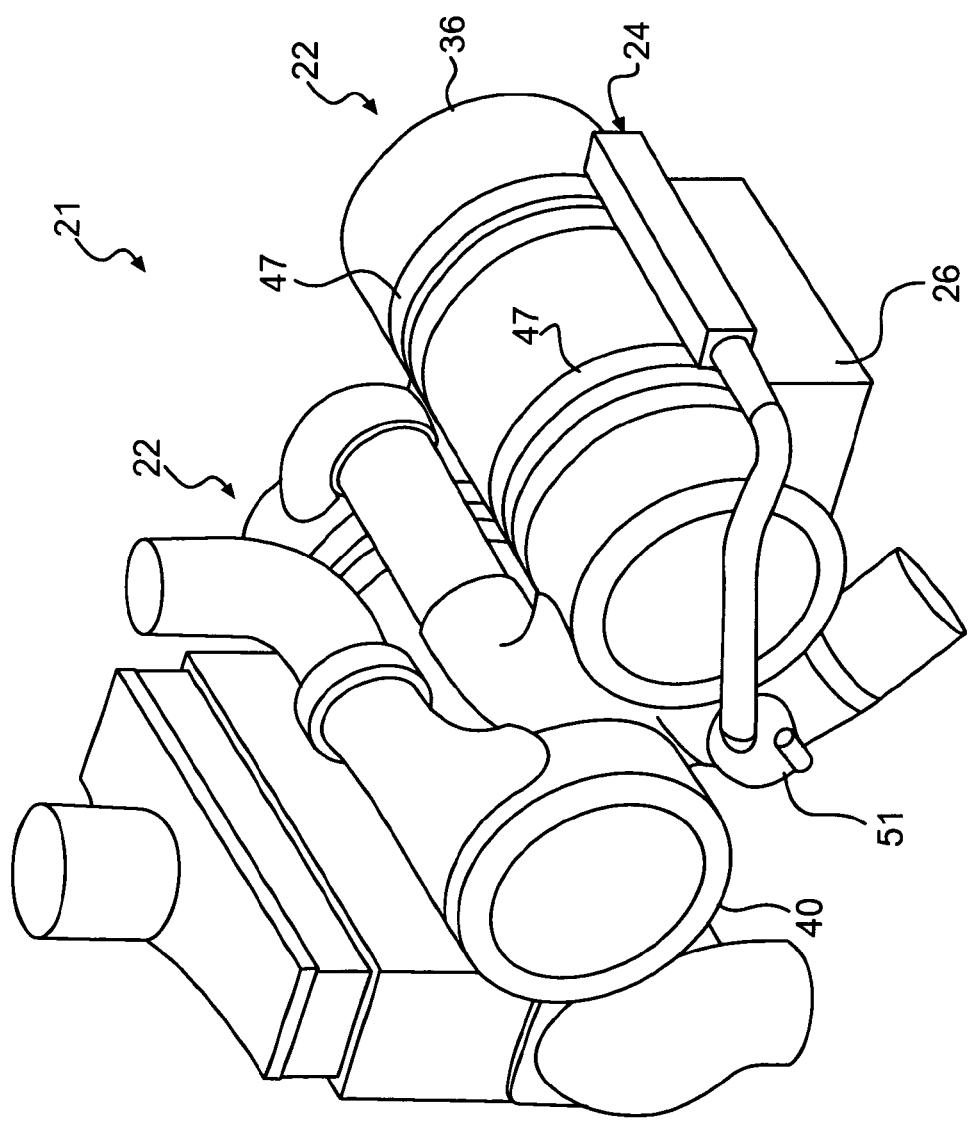
FIG. 4 is a diagrammatic illustration of an emissions control system.

FIG. 4 shows another embodiment of emissions control system 21. As shown in the embodiment of FIG. 4, mount 26 may also support or house a fourth exhaust treatment device 51. Fourth exhaust treatment device 51 may embody, for example, a regeneration device, such as a fuel-fired burner. Fourth exhaust treatment device 51 may be configured to inject fuel and ignite the injected fuel in order to heat the exhaust flow received from power source 19.

Figure 5:
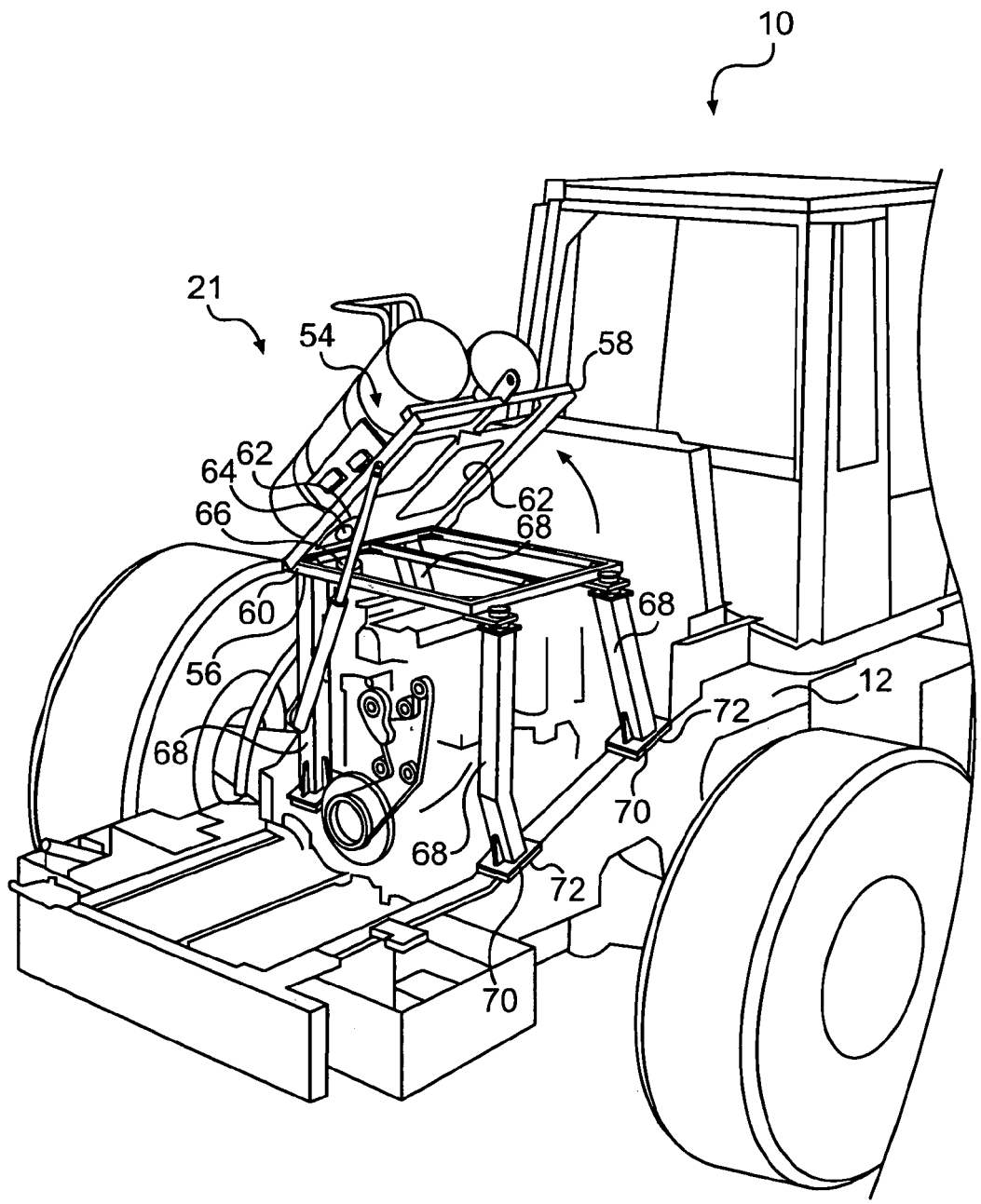
FIG. 5 is another isometric view of the machine of FIG. 1 illustrating the disclosed mounting assembly in a raised or open position.

As shown in FIG. 5, emissions control system 21 may be supported on or coupled to mounting assembly 54. Mounting assembly may be configured to position emissions control system 21 substantially adjacent to (e.g., above) power source 19. Mounting assembly 54 may include a platform assembly 56 having a platform 58 and a base frame 60. Platform 58 may be a substantially flat plate composed of a rigid material. It is contemplated that emissions control system 21, and specifically mount 26, may couple to or be integrally formed with platform 58. Platform 58 may also include one or more openings 62. An opening 62 may allow an inlet 64 of emissions control system 21 to connect with an exhaust port 66 of power source 19. Openings 62 may also reduce the overall weight of mounting assembly 54.

Mounting assembly 54 may be coupled to frame 12 via a plurality of supports 68. Alternatively, supports 68 may be omitted and base frame 60 and platform 58 may couple to a support wall (not shown) of machine 10. In order to enhance access to the power source 19, one or more openings (not shown) may be provided through the support wall.

Supports 68 may be configured to support and secure platform assembly 56. Supports 68 may couple to frame 12 and/or body 14 in any appropriate arrangement. Supports 68 may include, for example, elongated shafts, tubes, beams, plates, or any other supports known in the art. Each support 68 may include a base plate 70 that may be seated on or coupled to frame 12. A support pad 72 may be located between frame 12 and each base plate 70.

Support pads 72 may be seated on frame 12 and may provide an intermediary support between base plate 70 and frame 12. Support pads 72 may be secured in position using mechanical fasteners (e.g., bolts, screws, rivets, etc.), welding, or any other appropriate attachment method known in the art. It is contemplated that supports 68 may also couple to frame 12 directly, through one or more adapters, or through other structures known in the art.

In some embodiments, support pads 72 may be composed of a rigid metallic material. Alternatively, support pads 72 may be composed of a material that damps vibrations, such as, for example, a rubber-type material, a polymer, and/or any other appropriate vibration damping material known in the art. Fabricating support pads 72 of a vibration damping material may reduce vibration of mounting assembly 54. It is contemplated that the vibrations may be caused by, for example, operation of power source 19, motion of machine 10, and other sources of vibration.

Figure 6:
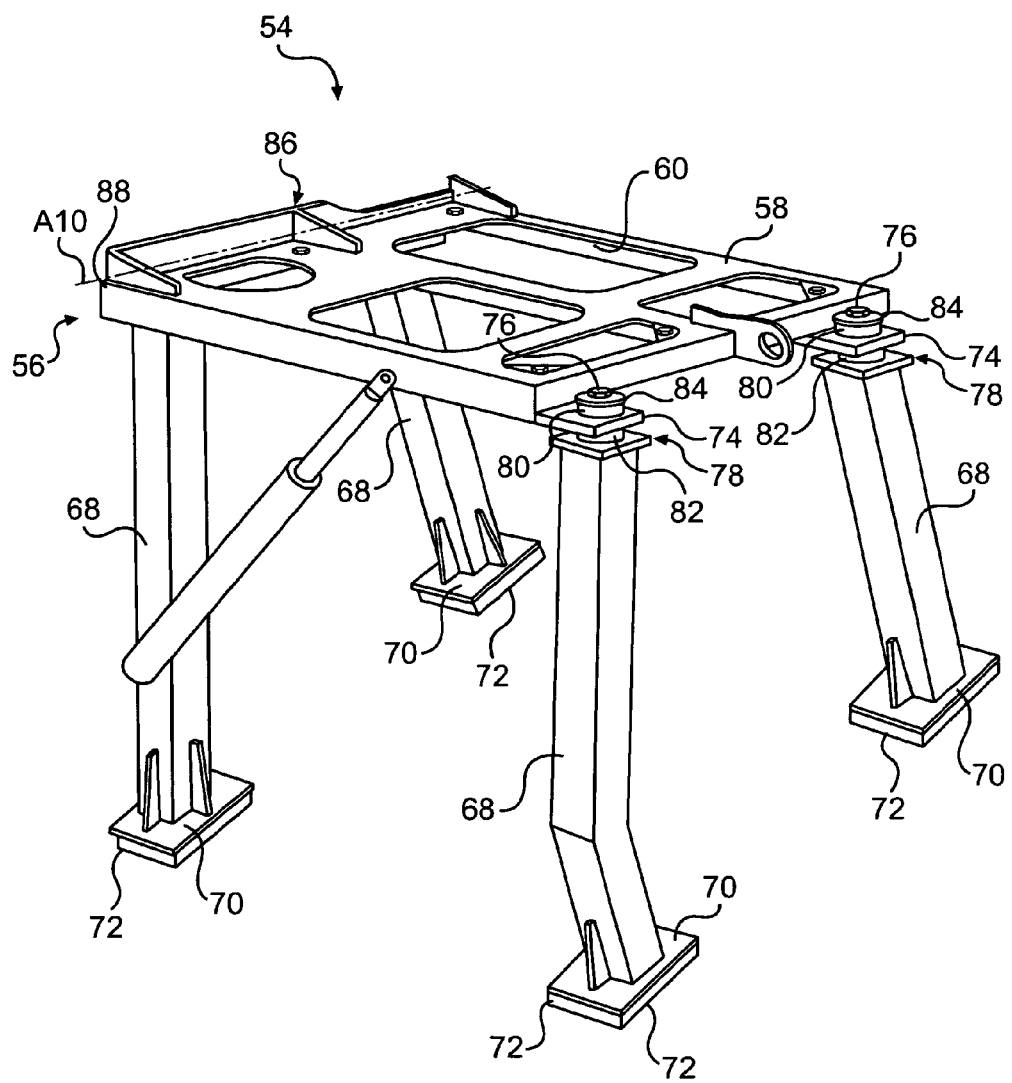
FIG. 6 is a diagrammatic illustration of the mounting assembly of FIGS. 2 and 5 in a closed or lowered position.

As seen in FIG. 6, platform assembly 56 may include one or more brackets 74 configured to couple with one or more supports 68. Each bracket 74 may be attached to platform assembly 56 via mechanical fastening, welding, or other joining methods known in the art. Alternatively, brackets 74 may be formed integrally with platform assembly 56. In one embodiment, a bracket 74 may be located at each corner of base frame 60. A fastening member 76 (e.g., a bolt, a screw, etc.) may pass through bracket 74 and attach to support 68. Fastening member 76 may also pass through at least one grommet or damping washer 78. For example, a first damping washer 80 may be located between an end of fastening member 76 and bracket 74, and a second damping washer 82 may be located between bracket 74 and support 68. It is contemplated that damping washers 78 may be configured to damp vibrations. Damping washers 78 may be composed of any appropriate material, such as, for example, a rubber-type material or a polymer. A rigid washer 84 may located between each first damping washer 80 and the end of fastening member 76 to minimize wear and provide a secure seating for fastening member 76. It will be appreciated, however, that the platform assembly 56 may be coupled to supports 68 by an alternate arrangement (e.g., via welding, alternative mechanical fasteners, etc.).

Platform 58 and base frame 60 may include one or more movable joints or components 86 to allow platform 58 and base frame 60 to move relative to one another. For example, platform 58 and base frame 60 may be pivotably coupled along an outer edge via a pivotable coupling 88. Pivotable coupling 88 may embody, for example, a hinge, a joint, or any other pivotable coupling known in the art.

Figure 7:
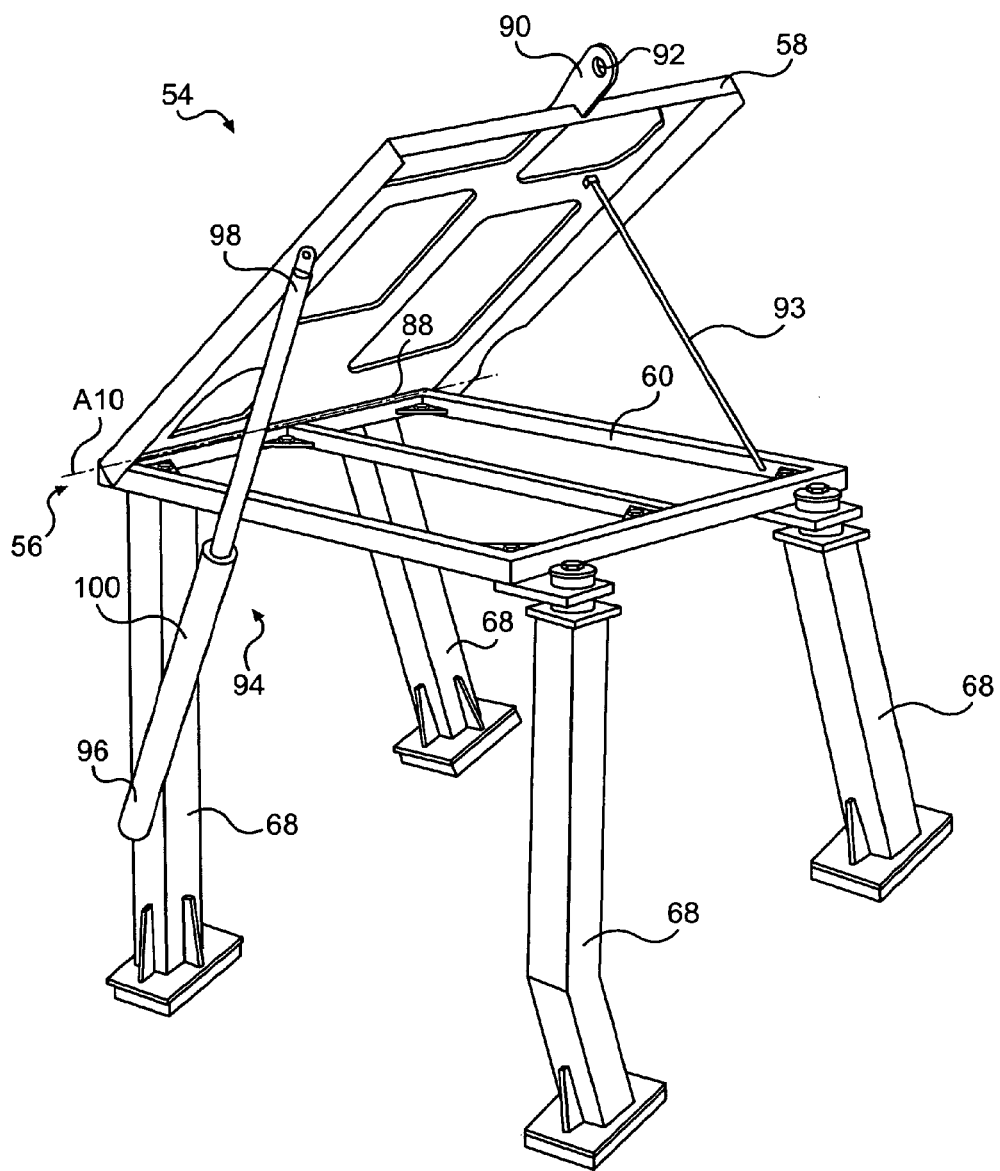
FIG. 7 is another diagrammatic illustration of the mounting assembly of FIGS. 2 and 5 in a raised or open position.

As shown in FIG. 7, pivotable coupling 88 may pivot about an axis, A10, such that platform 58 pivots away from base frame 60. Pivoting of platform 58 away from base frame 60 may enhance access to power source 19 and/or components of emissions control system 21. Specifically, platform 58 may be hinged upward to allow access to power source components located below emissions control system 21. Pivoting of platform 58 may also allow access to an underside of emissions control system 21. It is contemplated that multiple pivotable couplings 88 may be located along outer edge of platform 58 and base frame 60. In an alterative embodiment, platform 58 and base frame 60 may be coupled at one corner such that platform 58 may pivot about the corner (i.e., platform 58 may pivot about a vertical axis, thus remaining in the same plane as base frame 60). Platform 58 may thus pivot to the side, thereby allowing access to power source 19.

Platform 58 may also include a connector 90. Connector 90 may embody, for example, a rigid protrusion or flange. Connector 90 may include an opening 92 to which a winch or other external device (not shown) may couple to apply a lifting force to platform 58. It is also contemplated that a hook or other device (not shown) may couple to connector 90 to secure platform 58 in place during operation of machine 10. Mounting assembly 54 may alternatively or additionally utilize any other type of locking mechanism known in the art to secure platform 58. In some embodiments, platform 58 may include a prop rod 93 configured to secure platform 58 in its raised or open position. Prop rod 93 may be a rigid or telescoping member. Prop rod 93 may pivot or extend to secure platform 58 in its raised or open position.

Mounting assembly 54 may include one or more actuators 94 configured to supply a lifting or pivoting force to platform 58. Each actuator 94 may embody, for example, a hydraulic cylinder 96. Each hydraulic cylinder 96 may include a rod 98 that extends from a cylinder 100. It is also contemplated that actuator 94 may embody a motor and gear train, a pneumatic device, or any other type of actuator known in the art. Each actuator 94 may be coupled at one end to platform 58 and at the other end to base frame 60, support 68, or another structure secured to frame 12. When actuator 94 embodies a hydraulic cylinder 96, rod 98 may be coupled to platform 58 and cylinder 100 may be coupled to one support 68. As hydraulic cylinder 96 extends, platform 58 may pivot about axis A10. In this way, extension or retraction of the hydraulic cylinder 96 may result in the raising or lowering of platform 58 relative to base frame 60. Hydraulic cylinders 96 may be coupled to a hydraulic system (not shown) of machine 10. Alternately, hydraulic cylinders 96 may be independently operated. Actuators 94 may be controlled with any appropriate control mechanism (e.g., electronics 24).

Figure 8:
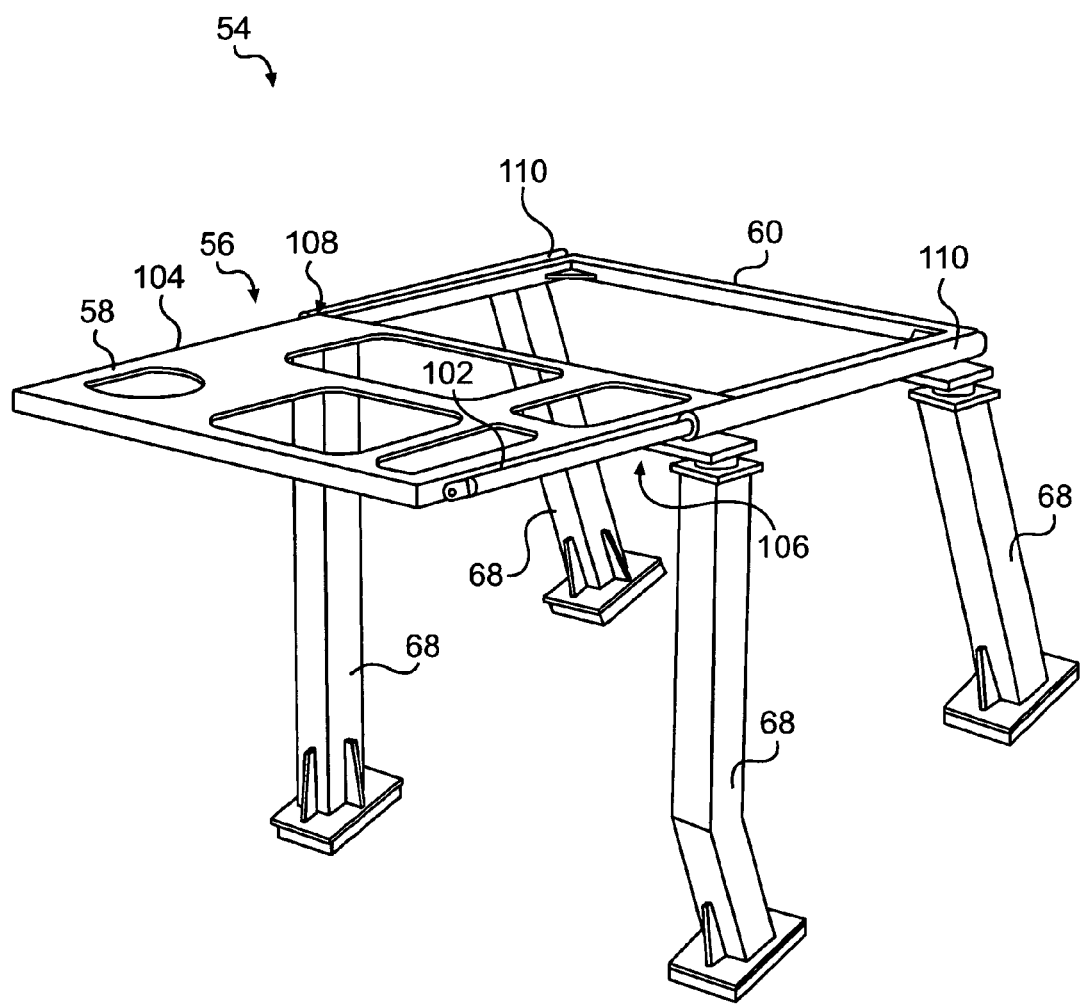
FIG. 8 is a diagrammatic illustration of an alternative embodiment of the mounting assembly of FIGS. 2 and 5.

FIG. 8 discloses another embodiment of mounting assembly 54. In the embodiment of FIG. 8, movable joints may comprise slidable couplings. Specifically, a first outer edge 102 and a second outer edge 104 of platform 58 may couple to base frame 60 via a first slidable coupling 106 and a second slidable coupling 108. Slidable couplings 106 and 108 may embody any appropriate slidable couplings, such as, for example, slidable channels, drawer couplings, bearing supports or any other couplings known in the art. It will further be appreciated that mounting assembly 54 may include a linkage arrangement (not shown). Slidable couplings 106 and 108 may allow platform 58 to move from a first position that is adjacent to or above power source 19 to a second position that is extended away from power source 19. Actuators 110, such as hydraulic, motor driven, or pneumatic actuators, may be used to slide platform 58 between the first and the second position. Locating the platform 58 in the second position may allow access to components of power source 19 and/or emissions control system 21. In other respects, the embodiment of mounting assembly 54 shown in FIG. 8 may be substantially the same as the embodiments of FIGS. 6 and 7.

Figure 9:
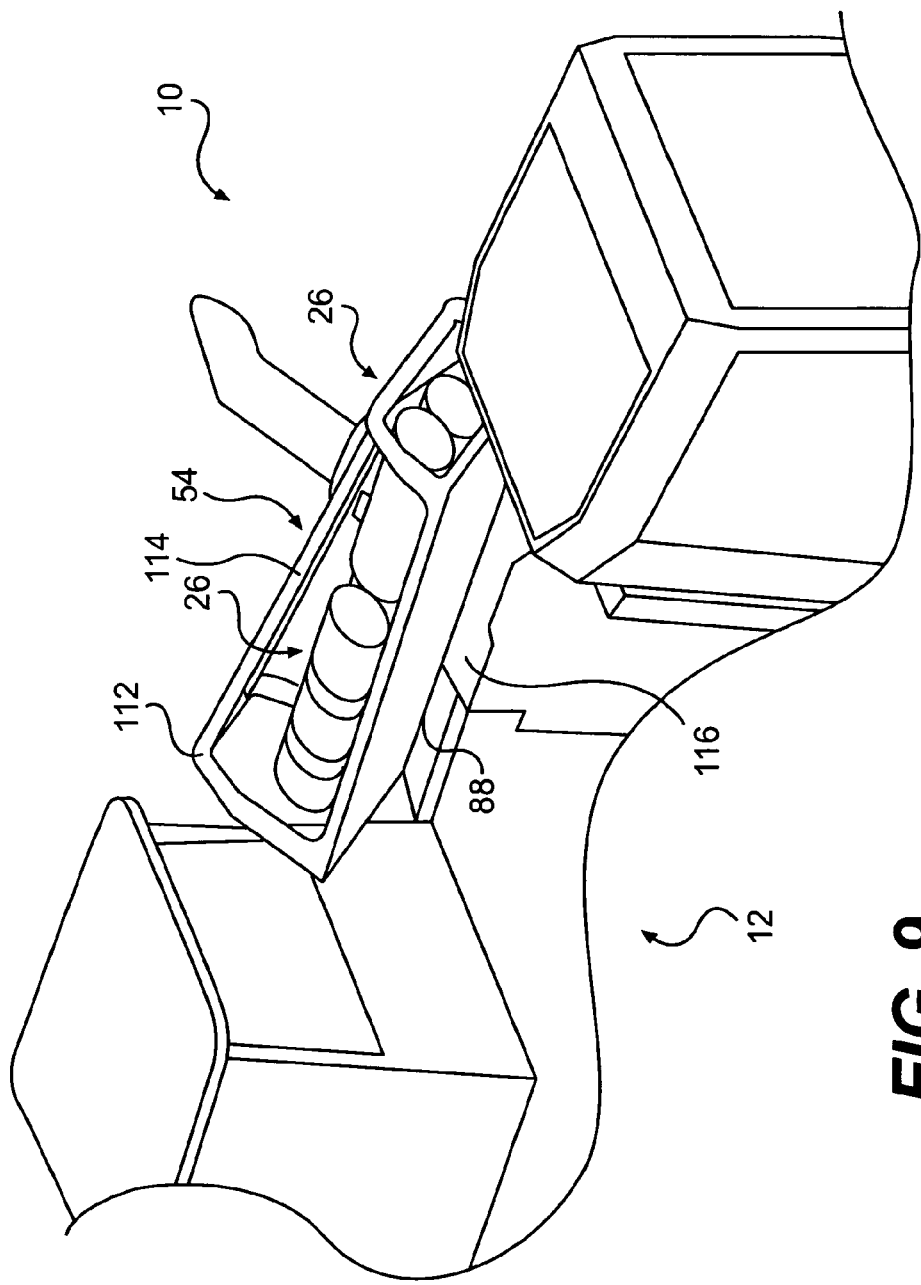
FIG. 9 is a diagrammatic illustration of the disclosed machine and another alternative embodiment of the mounting assembly of FIGS. 2 and 5.

FIG. 9 discloses a further embodiment of mounting assembly 54. In the embodiment of FIG. 9, a plurality of mounts 26 may couple to mounting assembly 54. Mounting assembly 54 may also include an upper frame 112 composed of a plurality of rigid members 114. In this embodiment, mounting assembly 54 may be pivotably coupled to a wall 116 which is secured to frame 12. In all other respects, the embodiment of FIG. 9 may be similar to the other embodiments disclosed herein.

Figure 10:
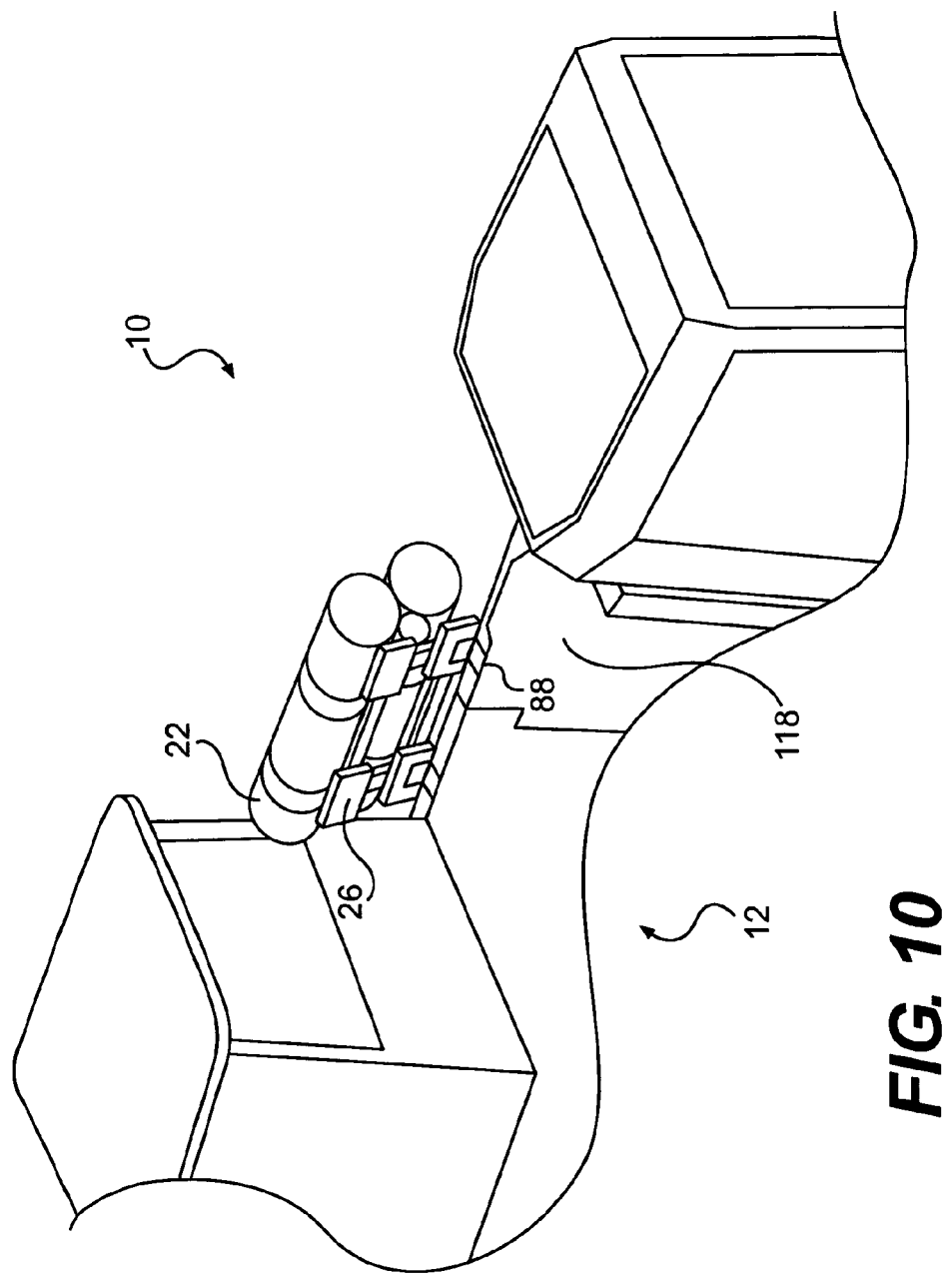
FIG. 10 is a diagrammatic illustration of the disclosed machine and a further alternative embodiment of the mounting assembly of FIGS. 2 and 5

FIG. 10 discloses a further embodiment of mounting assembly 54. In the embodiment of FIG. 10, mount 26 may couple directly to a base 118. Base 118 may embody, for example, wall 116 or base frame 60. In this embodiment, mount 26 maybe pivotably coupled to base 18. In all other respects, the embodiment of FIG. 10 may be similar to the other embodiments disclosed herein.

Referring back to FIG. 5, it is contemplated that the various components (e.g., fluid lines, electrical lines, data lines, mechanical couplings, etc.) of the power source 19, emissions control system 21, and mounting assembly 54 may be designed to quickly decouple from one another, either as platform 58 pivots away from base frame 60, or by separate action of decoupling the components. Any appropriate arrangement may be utilized to supply such quick decoupling.

Mounting assembly 54 may be fabricated by any appropriate method and from any appropriate materials. By way of example only, mounting assembly 54 may be formed of a metal, a composite, or another appropriate material. Mounting assembly 54 may be fabricated by any appropriate method, such as, for example, milling, stamping, extruding, cold rolling, casting, or other appropriate method. Assembly may likewise be performed by any appropriate method, such as, for example, welding or mechanical fasteners.

Industrial Applicability

The present disclosure is applicable to any machine that includes an emissions control system. The disclosed mounting assembly may yield enhanced access to both the emissions control system and/or the power source of a machine. Operation of the disclosed emissions control system and mounting assembly will now be described.

Referring to FIG. 2, air may be drawn into power source 19 for combustion. Fuel and air may be combusted to produce a mechanical work output and an exhaust flow. The exhaust flow may contain a complex mixture of air pollutants composed of gases and particulate matter. The exhaust flow may be directed from power source 19 via exhaust port 66 (see FIG. 5) and into exhaust treatment devices 22. The exhaust flow may pass through first exhaust treatment device 36 and enter third exhaust treatment device 46. The flow of exhaust may then pass into second exhaust treatment device 40. It is contemplated that the second exhaust treatment device 40 may include, for example, an SCR catalyst or an LNT. While inside of first, second, and/or third exhaust treatment devices 36, 40, and 46 the exhaust gas may undergo a pollutant reducing reaction. The flow of exhaust may then be released into the atmosphere. It is contemplated that in some embodiments, the flow of exhaust may pass through fourth exhaust treatment device 51 (e.g., a regeneration device) prior to entering first exhaust treatment device 36.

In some situations, such as maintenance, repair, or other similar situations, it may be necessary to access an upper portion of power source 19 and/or a lower portion of emissions control system 21. Such access may be achieved by driving actuator 94 from a first position (a closed position as seen in FIG. 2) to a second position (an open position as seen in FIG. 5). It is contemplated that exhaust treatment devices 22 may be fluidly coupled to power source 19 when platform 58 is in the first position and exhaust treatment devices 22 may automatically or manually decouple from power source 19 when platform 58 moves to the second position. When platform 58 is located in the second position, maintenance or other personnel may access power source 19 and/or emissions control system 21. After the maintenance, repair work, or other operation is completed, actuator 94 may lower platform 58 to the first position. Exhaust treatment devices 22 may then automatically or manually recouple to power source 19.

The disclosed mounting assembly may be applicable to any exhaust system. The disclosed mount and mounting assembly may provide a compact structure for mounting exhaust treatment devices in a power source compartment while still allowing access to both the power source and the emissions control system.

It will be apparent to those skilled in the art that various modifications and variations can be made to the disclosed mounting assembly. Other embodiments will be apparent to those skilled in the art from consideration of the specification and practice of the disclosed mounting assembly. It is intended that the specification and examples be considered as exemplary only, with a true scope being indicated by the following claims.

What is claimed is:

1. An exhaust system, comprising:
an emissions control system including a cradle and at least one exhaust treatment device secured to the cradle; and
a mounting assembly including:
a platform,
a base frame connected to the platform, and
a plurality of longitudinal support members connected to the base frame, the plurality of support members being connected generally transverse to the base frame;
the emissions control system being secured to the platform, the platform being movable relative to the base frame between a first position and a second position, the mounting assembly being configured to locate the emissions control system substantially adjacent to a power source in the first position and move the emissions control system away from the power source in the second position, the platform being positioned substantially parallel to the base frame in the first position.

2. The exhaust system of claim 1, wherein the platform is slidable relative to the base frame.

3. The exhaust system of claim 1, wherein the platform is rotatable relative to the base frame.

4. The exhaust system of claim 1, wherein the mounting assembly further includes at least one actuator configured to move the platform between the first and second positions.

5. The exhaust system of claim 4, wherein the actuator embodies a hydraulic cylinder.

6. The exhaust system of claim 1, wherein the at least one exhaust treatment device includes at least one of a diesel oxidation catalyst, a particulate filter, a selective catalytic reduction device, a lean NOx trap, a muffler, a regeneration device, or a reductant mixing device.

7. The exhaust system of claim 1, wherein the at least one exhaust treatment device is fluidly coupled to the power source when the platform is in the first position, the exhaust treatment device decoupling from the power source when the platform moves to the second position.

8. An exhaust system, comprising:
a cradle having a first cradling surface configured to support a first exhaust treatment device and a second cradling surface configured to support a second exhaust treatment device; and
a mounting assembly including a platform and a base frame connected to the platform, the cradle being secured to the platform,
the platform being movable relative to the base frame between a first position and a second position, the first exhaust treatment device and the second exhaust treatment device being fluidly coupled to the power source when the platform is in the first position, the first exhaust treatment device and the second exhaust treatment device decoupling from the power source when the platform moves to the second position.

9. The exhaust system of claim 8, wherein the platform is coupled to the base frame via at least one slidable coupling.

10. The exhaust system of claim 8, wherein the platform is coupled to the base frame via at least one pivotable coupling.

11. The exhaust system of claim 8, wherein the mounting assembly further includes at least one actuator configured to move the platform between the first and second positions.

12. The exhaust system of claim 11, wherein the actuator embodies a hydraulic cylinder.

13. The exhaust system of claim 8, wherein the first exhaust treatment device is a selective catalytic reduction device and the second exhaust treatment device is selected from a group consisting of a diesel oxidation catalyst, a particulate filter, a lean NOx trap, a muffler, a regeneration device, and a reductant mixing device.

14. The exhaust system of claim 8, wherein the base frame is coupled to a plurality of supports.

15. The exhaust system of claim 14, wherein the plurality of supports are longitudinal supports that are connected generally transverse to the base frame.

16. An exhaust system, comprising:
an emissions control system including a cradle and at least one exhaust treatment device secured to the cradle; and
a mounting assembly including a platform, a base frame and a plurality of longitudinal support members connected generally transverse to the base frame, the cradle being secured to the platform, and the platform being pivotably secured to the base frame,
wherein the mounting assembly is configured to position the emissions control system above a power source, the platform and cradle being movable relative to the base between a first position and a second position, the at least one exhaust treatment device being fluidly coupled to the power source when the mount is in the first position, and the exhaust treatment device decoupling from the power source when the platform and cradle move to the second position.

17. The exhaust system of claim 16, wherein the mounting assembly further includes at least one actuator configured to move the cradle between the first and second positions.

18. An exhaust system, comprising:
an emissions control system including a cradle having a first cradling surface configured to support a first exhaust treatment device and a second cradling surface configured to support a second exhaust treatment device; and
a mounting assembly including:
a platform,
a base frame to which the platform is pivotably connected, and
a plurality of longitudinal support members connected to the base frame generally transverse to the base frame and configured to hold the base frame above a power source;
wherein the emissions control system is secured to the platform, the mounting assembly being configured to position the emissions control system above the power source in a first position and away from the power source in a second position.

19. The exhaust system of claim 18, wherein the first exhaust treatment device is a selective catalytic reduction device and the second exhaust treatment device is selected from a group consisting of a diesel oxidation catalyst, a particulate filter, a lean NOx trap, a muffler, a regeneration device, and a reductant mixing device.

20. The exhaust system of claim 18, wherein the mounting assembly further includes at least one actuator configured to move the cradle between the first and second positions.

21. The exhaust system of claim 18, wherein the platform is positioned substantially parallel to the base frame in the first position.

22. The exhaust system of claim 18, further including vibration-damping support pads located at connection points between the support members and the base frame.

* * * * *